United States Patent
Tandon et al.

(10) Patent No.: US 10,482,610 B2
(45) Date of Patent: Nov. 19, 2019

(54) DETECTION OF PARTIALLY MOTION-BLURRED VIDEO FRAMES

(71) Applicant: Adobe Inc., San Jose, CA (US)

(72) Inventors: Sagar Tandon, Ghaziabad (IN); Abhishek Shah, Pitnam Pura (IN)

(73) Assignee: Adobe Inc., San Jose, CA (US)

( * ) Notice: Subject to any disclaimer, the term of this patent is extended or adjusted under 35 U.S.C. 154(b) by 93 days.

(21) Appl. No.: 15/800,678

(22) Filed: Nov. 1, 2017

(65) Prior Publication Data

US 2019/0130585 A1    May 2, 2019

(51) Int. Cl.
*G06T 7/246* (2017.01)
*G06T 5/00* (2006.01)
*G06K 9/00* (2006.01)
*G06T 7/254* (2017.01)

(52) U.S. Cl.
CPC .............. *G06T 7/246* (2017.01); *G06K 9/00* (2013.01); *G06T 5/003* (2013.01); *G06T 7/254* (2017.01); *G06T 2207/10016* (2013.01); *G06T 2207/20201* (2013.01)

(58) Field of Classification Search
CPC ........... G06T 7/246; G06T 5/003; G06T 2207/10016; G06T 2207/20201; G06K 9/00765; G06K 9/00744
See application file for complete search history.

(56) References Cited

U.S. PATENT DOCUMENTS

| | | | |
|---|---|---|---|
| 8,179,466 B2* | 5/2012 | Border | H04N 5/2353 348/222.1 |
| 8,773,548 B2* | 7/2014 | Kobayashi | G06K 9/036 348/222.1 |
| 9,542,754 B2* | 1/2017 | Endo | H04N 5/23261 |
| 2008/0278584 A1* | 11/2008 | Shih | G06T 7/215 348/169 |
| 2016/0366334 A1* | 12/2016 | Kim | H04N 5/23219 |
| 2017/0094192 A1* | 3/2017 | Adsumilli | H04N 5/272 |
| 2017/0116743 A1* | 4/2017 | Matsumoto | G06K 9/00805 |
| 2019/0013047 A1* | 1/2019 | Wait | G11B 27/002 |
| 2019/0066312 A1* | 2/2019 | Kaneko | G01P 3/36 |

* cited by examiner

*Primary Examiner* — Brenda C Bernardi
(74) *Attorney, Agent, or Firm* — Kilpatrick Townsend & Stockton LLP (57) ABSTRACT

An automated motion-blur detection process can detect frames in digital videos where only a part of the frame exhibits motion blur. Certain embodiments programmatically identify a plurality of feature points within a video clip, and calculate a speed of each feature point within the video clip. A collective speed of the plurality of feature points is determined based on the speed of each feature point. A selection factor is compared to a selection threshold for each video frame. The selection factor is based at least in part on the collective speed of the plurality of feature points. Based on this comparison, at least one video frame from within the video clip is selected. In some aspects, the selected video frame is relatively free of motion blur, even motion blur that occurs in only a part of the image.

20 Claims, 4 Drawing Sheets

DETECTION OF PARTIALLY MOTION-BLURRED VIDEO FRAMES

TECHNICAL FIELD

This disclosure relates generally to the field of digital video processing. More specifically, this disclosure relates to processing techniques for identifying individual frames from a video that are suitable for specific uses, such as for use as high-quality stills.

BACKGROUND

Since some content in video is often moving, extracting non-blurry, high-quality frames to use as still photos can be a challenging task. Although certain existing solutions automate the process of searching for quality frames, which is tedious or infeasible to perform manually, these solutions present disadvantages. For instance, existing blur detection solutions are designed to detect and exclude video frames that are completely or nearly completely blurry. However, many videos have frames where a majority of the content in the frame is clear, but part of the content in the frame exhibits motion blur. In such frames, stationary content is clear, but moving content is blurry. As examples, the moving content may be a ball being thrown, a hand or a foot, any of which can move relatively quickly compared to other moving content (e.g., active people in the frame). Such frames may not be detected using existing blur detection algorithms. Thus, when using blur detection to identify the clearest frames for use as stills and to exclude frames with motion blur, existing techniques cause false positives to be included in the final result.

SUMMARY

Certain embodiments for detection of motion-blurred video frames involve programmatically identifying a plurality of feature points within a video clip, and calculating a speed of each feature point within the video clip. A collective speed of the plurality of feature points for each video frame of a plurality of video frames is determined based on the speed of each feature point. A selection factor is compared to a selection threshold for each video frame. The selection factor is based at least in part on the collective speed of the plurality of feature points. Based on this comparison, at least one video frame from within the video clip is selected. In some aspects, the selected video frame is relatively free of motion blur, even motion blur that occurs in only a part of the image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As described above, existing blur-detection techniques are often ineffective for identifying the clearest frames in a video clip (e.g., for use as still photos) if only part of the frame exhibits motion blur. Embodiments described herein address these issues by allowing automated detection of partially motion-blurred video frames. These embodiments involve excluding the partially motion-blurred video frames from selection as stills so that programmatically selected video frames are relatively free of motion blur, even motion blur that occurs in only a part of the image. The detection of partially motion-blurred video frames can be included in a digital video editing application, for example, as part of a feature to automatically select high-quality stills from a video clip.

The following non-limiting example is provided to introduce certain embodiments. In this example, a video editing application accesses a video clip from which certain frames should be extracted for use as clear photos. The video editing application identifies feature points within a video clip. A feature point is a pixel or small group of pixels that is determined to be part of a depiction of a persistent visual feature in a video sequence. A feature point can be associated with any object. Examples include an eye, a finger, the head of a golf club, and a portion of the markings on a ball. The video editing application calculates a speed of motion for each feature point. The speed of a feature point indicates how fast it is moving relative to frame boundaries over the course of at least two frames. The video editing application uses the calculated speeds of the feature points to determine collective speed of the feature points for each video frame in the video clip. In one example, the collective speed is the average of the speeds of all feature points being tracked. The collective speed of the feature points indicates how much motion is generally taking place in the video clip. Other statistical measures of the overall speed of the feature points can be used.

Continuing with this example, the video editing application uses at least the collective speed to determine a selection factor for extracting video frames. The selection factor can be an indication of image quality, in which case the selection factor might be considered a quality score having a higher value for frames with less motion, so that only frames with feature points that are relatively free from motion blur are selected. In another alternative, a score based on lack of motion as just described can be combined with another quality score based on image content, and the selection factor can be based on both. The video editing application compares the selection factor to a selection threshold for each video frame and selects one or more video frames from the video clip if the selection factor for those frames exceeds the selection threshold.

Certain embodiments provide improvements over existing blur-detection solutions. For instance, a video clip of several frames in which a subject's hand moves quickly across the screen while almost everything else in the screen is stationary might present a problem for existing blur-detection. Since the motion blur from the hand only encompasses a relatively small portion of the screen, existing blur detection techniques would not detect these frames as blurred. The automated selection of clear frames would then include frames with the blurry hand. If the feature to automatically select clear frames instead used an embodiment described herein these partially-motion blurred frames would be detected and excluded from the automated selection of clear video frames. The embodiments described herein would necessarily also detect completely-motion blurred frames, and therefore could completely replace existing motion-blur detection algorithms. Alternatively, the embodiments described herein can be combined with existing motion-blur detection algorithms.

As used herein, the term "feature point" is used to refer to is a pixel or small group of pixels that is determined to be part of a depiction of a persistent visual feature in a video sequence. The term "speed" as used herein refers to a measure of how fast a feature point is moving relative to the border of a video frame. Typically, the speed is measured in units of pixels per frame (pixels/frame). "Collective speed" refers to a statistical measure of the overall speed of feature points in a video clip. As examples, the statistical measure can be an average, median, a measure that mathematically emphasize isolated feature points such as maximum or minimum. A "segment" is a portion of video clip resulting from a video clip being divided into multiple groups of frames so that a score may be assigned to each frame.

A "selection factor" is any numerical value assigned to a video clip for comparison purposes. A "selection threshold" is a cutoff value to which the selection factor is compared to make determinations. The speed of motion alone (collective or otherwise) can serve as the selection factor. However, a "score" is a qualitative indicator. For example, when the selection factor is to be an indication of image quality, the selection factor is based on and may be equal to a "motion score" having a higher value for frames with less motion. Other terms used herein are either defined where used or have customary meanings as understood in the art.

Various embodiments involve different techniques for providing the selection threshold used by the video editing application. The value of the selection threshold above can be coded into the video editing software. Alternatively, the threshold can be provided by user input, such as with a dropdown box or slider that controls the minimum quality of frame that should be extracted, or that specifies relatively how many frames are desired. If fewer frames are needed, the selection threshold is raised. Frames selected can be indicated by displaying thumbnails of the frames. If a user changes the value of the selection threshold either directly or indirectly, the video editing application can interactively re-identify the selected video frames.

The selection factor that is compared to the selection threshold to select a video frame can be based solely on detected motion blur. Alternatively, the selection factor can also take into account other indicators of the quality of a video frame for use as a still. For example, the selection factor can be based on both a motion score and a content score, where the content score is indicative of desirable content. As a more specific example, face detection can be used to determine the likelihood that a face is present in a frame, and this likelihood can be used as a content score.

While a typical use for detection of motion-blurred video frames is to exclude such frames from selection as high-quality stills, the automated detection of such frames could find other uses. For example, partially motion-blurred frames could be programmatically selected rather than excluded from a selection of video frames. Specifically selecting such frames might be used, for example, to critically analyze motion for scientific study, or to provide still images with a desired artistic effect.

Figure 1:
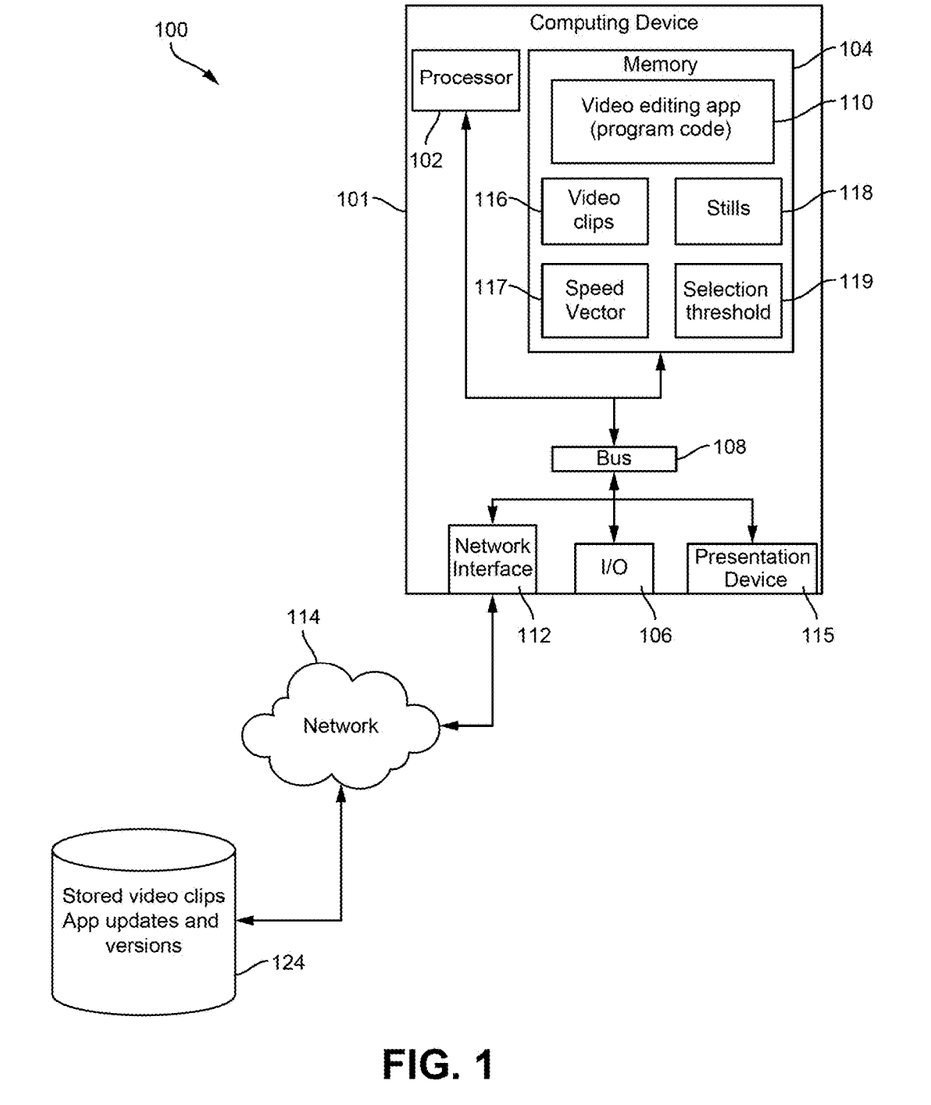
FIG. 1. is a diagram depicting an example of a system and computing environment in which detection motion-blurred video frames is practiced, according to certain embodiments.

Any suitable computing system or group of computing systems can be used for performing the operations described herein. Referring now to the drawings, FIG. 1 depicts a system 100 that executes a video editing application program (an "app") with the capability of detecting partially motion-blurred video frames according to example embodiments described herein. System 100 includes computing device 101, which in turn includes a processor 102 communicatively coupled to one or more memory devices 104. The processor 102 executes computer-executable program code stored in a memory device 104, accesses information stored in the memory device 104, or both. Examples of the processor 102 include a microprocessor, an application-specific integrated circuit ("ASIC"), a field-programmable gate array ("FPGA"), or any other suitable processing device. The processor 102 can include any number of processing devices, including a single processing device. The memory device 104 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 1, the system 100 may also include a number of external or internal devices, such as input or output devices. For example, the computing device 101 is shown with one or more input/output ("I/O") interfaces 106. An I/O interface 106 can receive input from input devices or provide output to output devices (not shown). One or more buses 108 are also included in the computing device 101. The bus 108 communicatively couples one or more components of a respective one of the computing device 101. The processor 102 executes program code that configures the computing device 101 to perform one or more of the operations described herein. The program code includes, for example, video editing application 110, or other suitable applications that perform one or more operations described herein. The program code may be resident in the memory device 104 or any suitable computer-readable medium and may be executed by the processor 102 or any other suitable processor. Memory device 104 may also be used to store video clips 116, a speed vector 117 of collective speeds for each video frame, extracted stills (video frames) 118, and a selection threshold 119, which can either be default values or values set via input from the user.

The system 100 of FIG. 1 also includes a network interface device 112. The network interface device 112 includes any device or group of devices suitable for establishing a wired or wireless data connection to one or more data networks 114. Non-limiting examples of the network interface device 112 include an Ethernet network adapter, a modem, and/or the like. The system 100 is able to communicate with one or more other computing devices (e.g., another computing device executing a vector graphics application, not shown) via data network 114 using the network interface device 112. While network interface device 112 is illustrated connected to network 114, which is an optional part of system 100 for purposes of this disclosure, it can also connect to other networks and devices that are remote from system 100.

Staying with FIG. 1, in some embodiments, the computing device 101 also includes the presentation device 115 depicted in FIG. 1. A presentation device 115 can include any device or group of devices suitable for providing visual, auditory, or other suitable sensory output. In example embodiments, presentation device 115 displays video clips and video frames. Non-limiting examples of the presentation device 115 include a touchscreen, a monitor, a separate mobile computing device, etc. In some aspects, the presentation device 115 can include a remote client-computing device that communicates with the system 100 using one or more data networks 114 described herein. Data network 114 can also connect computing device 101 to a network storage device 124, which can be used as a repository for stored video clips for use with the video editing application 110, as well as updated or archived versions of the video editing software for distribution. Like the memory device 104, network storage device 124 can include any suitable non-transitory computer-readable medium for storing data, program code, or both.

Figure 2:
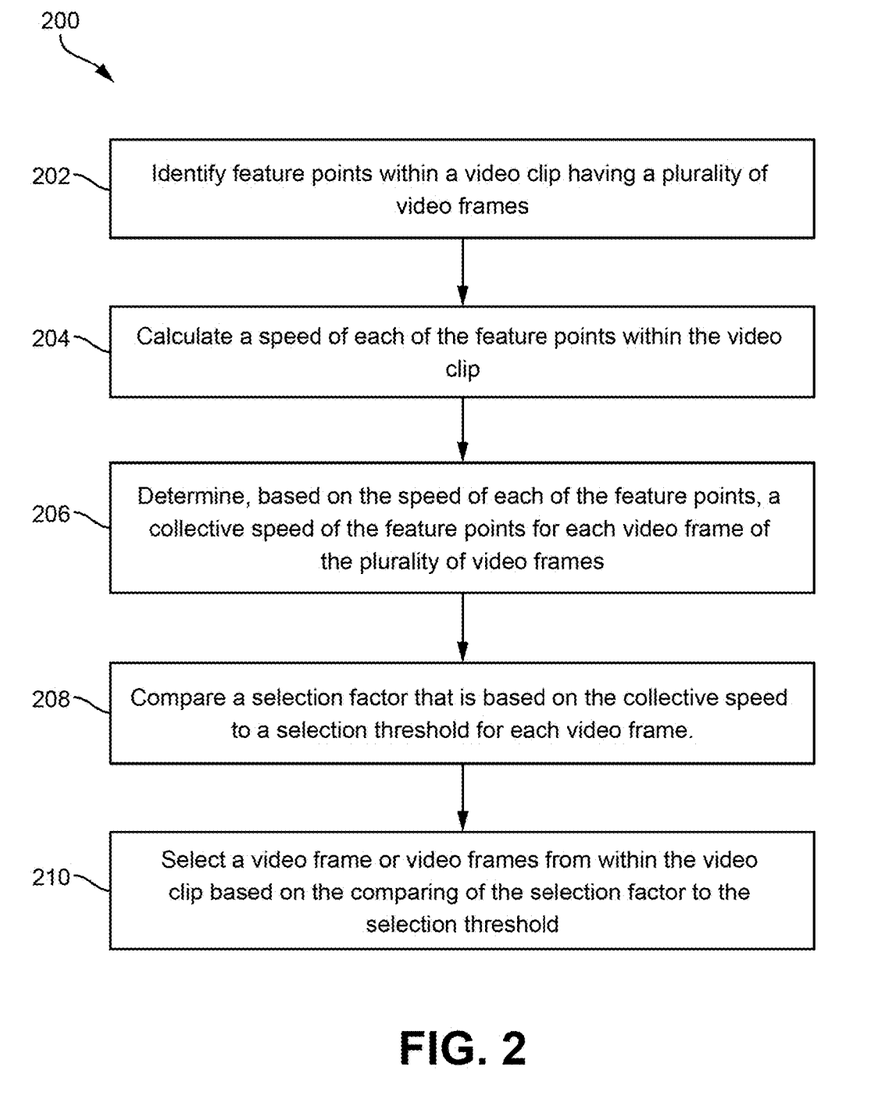
FIG. 2 is a flowchart depicting an example of a process for detecting motion-blurred video frames, according to some embodiments.

FIG. 2 presents a flowchart depicting an example of a process 200 for detecting motion-blurred video frames with a computing device carrying out the process by executing suitable program code.

At block 202 a plurality of feature points are identified within a video clip having a plurality of video frames. A feature point is a pixel or small group of pixels that is determined to be part of a depiction of a persistent visual feature in a video sequence, such as the hand of a person moving in the frame. Feature points are identified by processor 102 of FIG. 1.

At block 204, a speed of each of the feature points within the video clip is calculated. As an example, the speed can be calculated in units of pixels/frame. The calculation is carried out by processor 102 of FIG. 1

At block 206, the computing device determines, based on the speed of each of the feature points, a collective speed of the feature points for each video frame of the plurality of video frames. The collective speed is a statistical measure of the overall speed of feature points in a video clip. The collective speed is determined by processor 102.

At block 208, a selection factor corresponding to each video frame is compared to a selection threshold. This comparison is made by processor 102. The selection factor is based at least in part on the lack of collective speed of the plurality of feature points. As previously discussed, the selection factor can be based solely on the speed of feature points, or it can take other quality measures into account.

At block 210, a video frame or video frames are selected by processor 102 based on the comparison of the selection factor to the selection threshold. In a typical video editing application, frames with less motion are more likely to be selected. In such a case, frames in which a high degree of motion or partial motion are detected are withheld from being selected.

Figure 3:
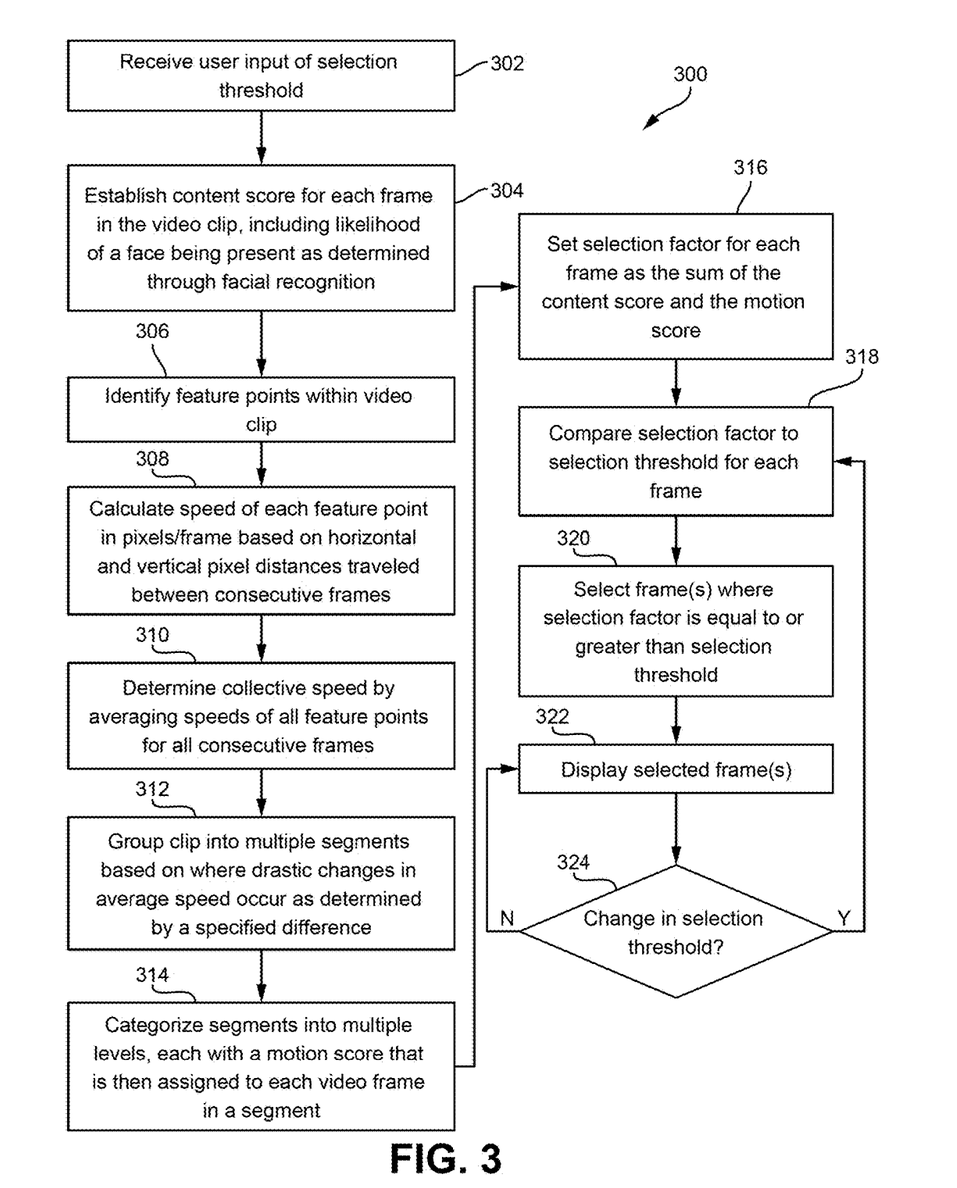
FIG. 3 is a flowchart depicting an additional example of a process for detecting motion-blurred video frames, according to certain embodiments.

FIG. 3 is a flowchart depicting an example process 300 for detection of motion-blurred video frames and then the selection of relatively clear video frames by excluding those with significant motion blur. In this example, content is also taken into account, though as previously discussed, the content-based part of the selection process is optional. The blur detection in the example of FIG. 3 includes detection of partially motion-blurred video frames. At block 302, user input is received through I/O interface 106 that sets a selection threshold 119, which is stored in memory 104 of FIG. 1. At block 304 of process 300, a value of a content score is established for each frame in a video clip by processor 102. A content score can be based on any of multiple known algorithms, for example, those that evaluate lighting, color, framing, or the likely presence or absence of various objects. In this example, the content score is a measure of the likelihood of a face being present in a frame, as determined by any of various known facial recognition techniques. For purposes of this discussion, the content score can be designated K, where the content score for the ith frame is $K_i$. In block 306 of FIG. 3, feature points in the video clip are identified using standard feature tracking techniques. The video clip can be part of video clips 116 of FIG. 1 and the feature point identification is performed by processor 102 of FIG. 1. At block 308, the speed of each feature point is calculated by using processor 102 to calculate horizontal and vertical pixel distances traveled between consecutive frames for each feature point. For example, consider the case of two consecutive frames:

$$F_i \text{ and } F_j (j=i+1).$$

Assume one point P in frame $F_i$ moves to P' frame $F_j$. If $Xp_{ij}$ and $Yp_{ij}$ are the horizontal and vertical distances in pixels travelled by point P from frame $F_i$ and $F_j$, the speed of the point ($Sp_{ij}$) in units of pixels/frame is:

$$Sp_{ij}=\text{sqrt}(sq(Xp_{ij})+sq(Yp_{ij}))*fps/(F_j-F_i),$$

where fps is the frame rate of the video clip.

Still referring to FIG. 3, at block 310 a collective speed of the feature points for each video frame is determined, in this example, by averaging the speeds of all the feature points for each consecutive frame. In this example, the average speed is the collective speed. If the average speed is $AS_{ij}$, then:

$$AS_{ij}=(\text{sum of speed of all points})/(\text{number of such points}), \text{ or}$$

$$(S1_{ij}+S2_{ij}+ \ldots +Sk_{ij})/k, \text{ where } k \text{ is the number of such points.}$$

At this point in process 300, the selection factor in block 208 of FIG. 2 is calculated by processor 102 of FIG. 1. The average speed for all consecutive frames of the video clip, can be stored in speed vector 117 of FIG. 1, for example, as $AS_{12}, AS_{23}, AS_{34}$, etc. Elements of the speed vector are then selected according to whether the average speed values are changing from frame to frame beyond a specified difference, D. For example, if from $AS_{rt}$ to $AS_{ij}$ the consecutive value changes less than or equal to D (note t=r+1 and j=i+1), the change can be assumed to be nominal and would not be used to segment the video clip. If by contrast from $AS_{ij}$ and $AS_{jq}$ the value changes in excess of D ($|AS_{ij}-AS_{jq}|>D$), then frame number 'j' is treated as having an significant speed change (note q=j+1). Based on this assumption the entire video clip is grouped into multiple segments (denoted as VS) at block 312 of process 300. All frames in a given segment will exhibit a similar level of average speed of motion of feature points. In the above case, frames from frame 'r' through frame 'i' will be part of one segment.

Based on the above, if $VS_m$ denotes the mth segment of the video, for each video segment $VS_m$, the average speed of movement (VSA) of the segment is set as:

$$VSA_m=(\text{sum of average speed of all consecutive frames},AS)/(\text{number of frames}-1),$$

where, $VS_m = (AS_{12} + AS_{23} + A_{h-1\ h})/(h-1)$ and where h is the number of frames in this segment.

Based on the spread of $VSA_m$, the segments can be categorized with a motion score at block 314 of process 300 of FIG. 3. Depending on implementation, the motion score could be directly indicative of motion-blur or partial motion-blur, and could be used as the selection factor. For example, if levels of motion blur were designated $L_0, L_1, \ldots, L_n$, then the $L_0$ level would designate a segment or segments with minimum VSA and the $L_n$ level would designate a segment or segments with maximum VSA. The VSA for all frames in a segment would be relatively close. The level value for a segment would be assigned to each video frame in the segment.

In the example of FIG. 3, however, a motion score indicates a quality level, that is, it provides an indication of how clear the video frame is. Thus, in this embodiment, the $L_0$ segment is assigned a maximum motion score $SL_n$ and the $L_n$ segment is assigned a minimum motion score $SL_0$. The score of segment m based on this parameter can be designated $SL_m$ and that score is assigned to each video frame within the segment at block 314. At block 316 of process 300, the selection factor (SF) is set for each frame by processor 102 as the sum of the motion score and content score for the frame:

$$SF_i = SL_i + K_i.$$

Continuing with FIG. 3, at block 318 of process 300, the selection factor is compared to the selection threshold by processor 102. At block 320, frames with a selection factor greater than or equal to the selection threshold are selected. Each frame, or a representation of each frame, such as a thumbnail image, is optionally displayed at block 322 on presentation device 115 of FIG. 1. At block 324 of process 300, I/O interface 106 is monitored to determine if a user changes the value of the selection threshold, in which case the process from block 318 repeats to update the video frame selection. In some aspects, the display of frames or thumbnails can be updated on-screen, so that selected frames are interactively identified. If no input is received at block 324, frames continue to be displayed at block 322. Note that the choice to include equality in the comparison of the selection factor to the selection threshold is arbitrary. The comparison could be carried out so that only frames with a selection factor greater than the selection threshold are included.

Figure 4:
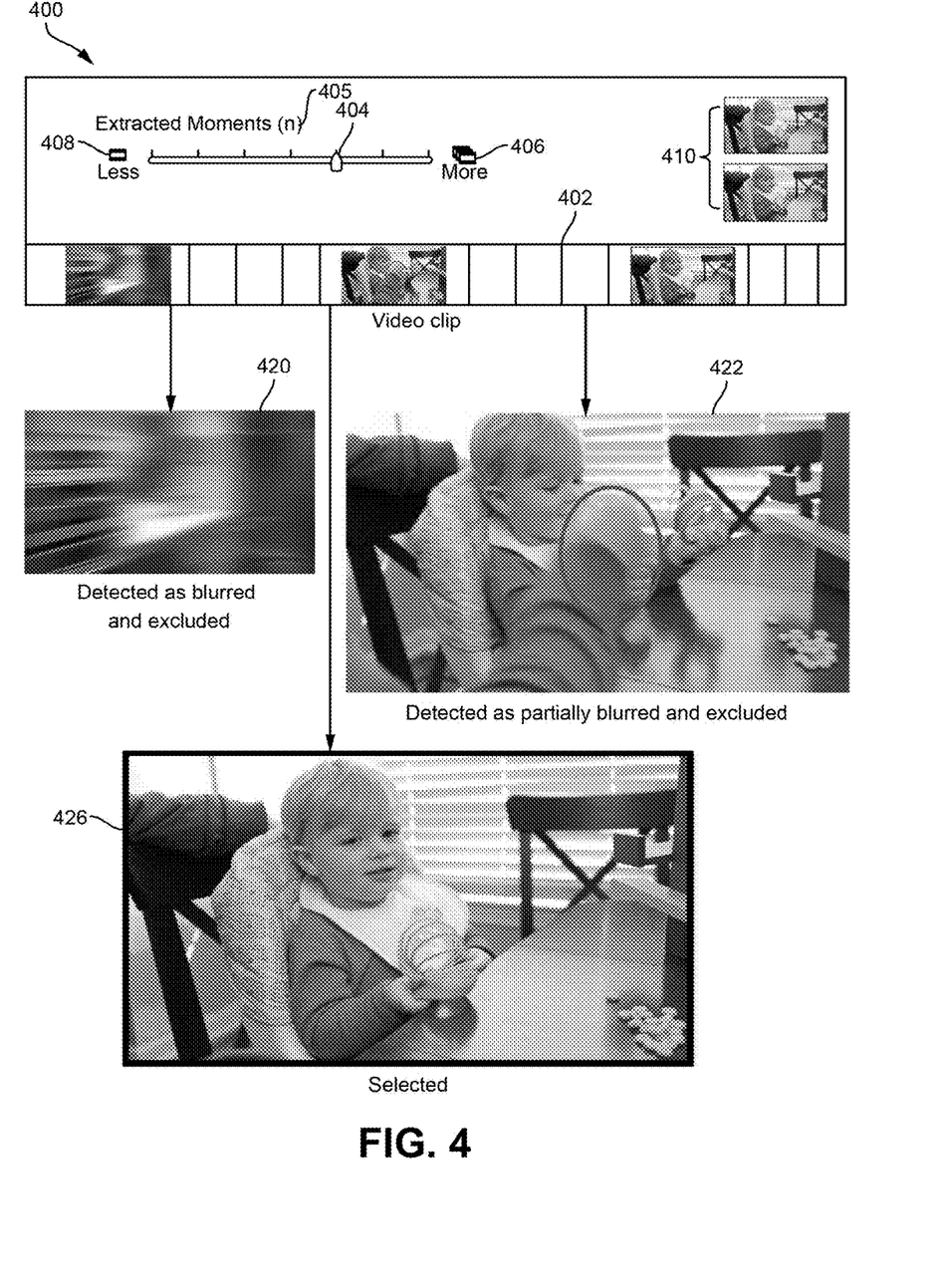
FIG. 4 is a schematic illustration of a user interface that can be used for interactively identifying specific video frames from a video clip using certain embodiments.

FIG. 4 is a schematic representation of a user interface 400 that can be used to interactively select clear video frames using the above described embodiments. In this particular example, the selection factor in use takes into account both content a lack of motion blur. More specifically, the computing device that is implementing user interface 400 is selecting frames based on face detection as well as lack of motion blur. User interface 400 is displaying a video clip 402. User interface 400 includes a slider 404, which is labeled "extracted moments." To extract more video frames, the user moves slider 404 right towards icon 406. To extract fewer video frames, the user moves slider 404 left towards icon 408. When the user moves slider 404 to the right, the selection threshold is lowered, so that more video frames have a selection factor that exceeds the selection threshold. When the user moves slider 404 to left, the selection threshold is raised, so that fewer video frames have a selection factor that exceeds the threshold. Thumbnail images 410 are shown in user interface 400 and represent video frames that are to be selected based on the current position of slider 404. In some aspects, the thumbnail images change and update interactively as the user moves slider 404. The number of video frames currently extracted is displayed near the label in parentheses 405.

Still referring to FIG. 4, examples of video frames that illustrate how they are dealt with by the video editing application are shown below user interface 400. Frame 420 is completely blurry and was detected and excluded from selection. The process described herein for detection of partially motion-blurred video frames would detect this frame. However, in some embodiments, a traditional blur detection algorithm could be used to filter out completely blurred video frames and an algorithm according to the embodiments described herein could be used solely to find partially motion-blurred video frames. Video frame 422 was detected as partially blurred and also excluded from selection. The partially blurred area of video frame 422 is shown inside the circle. Video frame 426 was selected and is represented within thumbnails 410. Video frame 426 is largely free of any motion blur and also exhibits a face, which was detected through facial recognition.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "selecting," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured" or "configures" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
    identifying, by a processor, a plurality of feature points within a video clip having a plurality of video frames;
    calculating, by the processor, a speed of each of the plurality of feature points within the video clip relative to frame boundaries over the course of at least two of the plurality of video frames;
    determining, by the processor and based on the speed of each of the plurality of feature points, a collective speed of the plurality of feature points for each video frame of the plurality of video frames;
    comparing, by the processor, a selection factor to a selection threshold for each video frame, wherein the selection factor is based at least in part on the collective speed of the plurality of feature points; and
    selecting, by the processor, at least one video frame from within the video clip based on the comparing of the selection factor to the selection threshold.

2. The method of claim 1 further comprising receiving user input of a value of the selection threshold.

3. The method of claim 2 wherein the user input comprises a change to the value of the selection threshold, and wherein the method further comprises interactively re-identifying the at least one video frame from within the video clip.

4. The method of claim 1 wherein the collective speed of the plurality of feature points comprises an average speed of the plurality of feature points.

5. The method of claim 1 further comprising:
    assigning a value of a motion score to each video frame based on the collective speed of the plurality of feature points;
    assigning a value of a content score to each video frame; and
    assigning a value of the selection factor to each video frame wherein the value of the selection factor is based on both the motion score and the content score.

6. The method of claim 5 wherein the content score includes a likelihood of a face being depicted in a video frame.

7. The method of claim 1 wherein the calculating of the speed of each of the plurality of feature points comprises:
    calculating a vertical pixel distance traveled by a feature point between consecutive video frames;
    calculating a horizontal pixel distance traveled by the feature point between the consecutive video frames; and
    determining a total pixel distance traveled by the feature point between the consecutive video frames from the vertical pixel distance and the horizontal pixel distance.

8. A system comprising:
    a processor; and
    a non-transitory computer-readable medium coupled to the processor, wherein the processor is configured to execute computer program code stored in the non-transitory computer-readable medium and thereby perform operations comprising:
        identifying a plurality of feature points within a video clip having a plurality of video frames, wherein a feature point can be associated with any object within the video clip;
        calculating a speed of each of the plurality of feature points within the video clip;
        determining, based on the speed of each of the plurality of feature points, a collective speed of the plurality of feature points for each video frame of the plurality of video frames;
        comparing a selection factor to a selection threshold for each video frame, wherein the selection factor is based at least in part on the collective speed of the plurality of feature points; and
        selecting at least one video frame from within the video clip based on the comparing of the selection factor to the selection threshold.

9. The system of claim 8 wherein the operations further comprise receiving user input of a value of the selection threshold.

10. The system of claim 8 wherein the collective speed of the plurality of feature points comprises an average speed of the plurality of feature points.

11. The system of claim 8 wherein the operations further comprise:
    assigning a value of a motion score to each video frame based on the collective speed of the plurality of feature points;
    assigning a value of a content score to each video frame; and
    assigning a value of the selection factor to each video frame wherein the value of the selection factor is based on both the motion score and the content score.

12. The system of claim 11 wherein the content score includes a likelihood of a face being depicted in a video frame.

13. The system of claim 8 wherein the calculating of the speed of each of the plurality of feature points comprises:
    calculating a vertical pixel distance traveled by a feature point between consecutive video frames;
    calculating a horizontal pixel distance traveled by the feature point between the consecutive video frames; and
    determining a total pixel distance traveled by the feature point between the consecutive video frames from the vertical pixel distance and the horizontal pixel distance.

14. A non-transitory computer-readable medium storing program code executable by a processor to perform operations, the operations comprising:
    identifying a plurality of feature points within a video clip having a plurality of video frames, wherein a feature point can be associated with any object within the video clip;
    calculating a speed of each of the plurality of feature points within the video clip relative to frame boundaries over the course of at least two of the plurality of video frames;
    determining, based on the speed of each of the plurality of feature points, a collective speed of the plurality of feature points for each video frame of the plurality of video frames;

comparing a selection factor to a selection threshold for each video frame, wherein the selection factor is based at least in part on the collective speed of the plurality of feature points; and selecting at least one video frame from within the video clip based on the comparing of the selection factor to the selection threshold.

15. The non-transitory computer-readable medium of claim 14 wherein the operations further comprise receiving user input of a value of the selection threshold.

16. The non-transitory computer-readable medium of claim 15 wherein the user input comprises a change to the value of the selection threshold, and wherein the operations further comprise interactively re-identifying the at least one video frame from within the video clip.

17. The non-transitory computer-readable medium of claim 14 wherein the collective speed of the plurality of feature points comprises an average speed of the plurality of feature points.

18. The non-transitory computer-readable medium of claim 14 wherein the operations further comprise:

assigning a value of a motion score to each video frame based on the collective speed of the plurality of feature points;

assigning a value of a content score to each video frame; and assigning a value of the selection factor to each video frame wherein the value of the selection factor is based on both the motion score and the content score.

19. The non-transitory computer-readable medium of claim 18 wherein the content score includes a likelihood of a face being depicted in a video frame.

20. The non-transitory computer-readable medium of claim 18 wherein the calculating of the speed of each of the plurality of feature points comprises:

calculating a vertical pixel distance traveled by a feature point between consecutive video frames;

calculating a horizontal pixel distance traveled by the feature point between the consecutive video frames; and determining a total pixel distance traveled by the feature point between the consecutive video frames from the vertical pixel distance and the horizontal pixel distance.

* * * * *